April 21, 1931.  R. LEE  1,801,674

ELECTRIC MOTOR

Filed July 2, 1928

WITNESSES
Irving J. Rose
M. E. Downey

INVENTOR
Royal Lee
By R. C. Caldwell
ATTORNEY

Patented Apr. 21, 1931

1,801,674

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

ELECTRIC MOTOR

Application filed July 2, 1928. Serial No. 289,956.

The invention relates to electric motors and more particularly to motors of the commutating type.

An object of the invention is to provide a simple and compact electric motor adapted for operation on either direct or alternating current, and particularly the latter, and capable of running at a substantially constant though adjustable speed by imparting thereto shunt characteristics, thereby serving many applications, especially in the fractional horsepower field, for which the variable speed of the series type of motor and the fixed speed and excessive bulk of the induction motor are objectionable.

Another object of the invention is to provide a simple but effective compensating or neutralizing means for commutating type electric motors which is particularly well adapted for the smaller sizes of motors and is capable of incorporation in a motor without reducing the available winding space.

A further object is to provide a compensating winding which is self-contained with respect to any one pole area.

A further object is to construct a compensating winding by means of a metallic loop surrounding a polar projection at its inner and outer sides to lie in a plane substantially along the axis of the projection.

A further object is to utilize the compensating loop as a means for attaching the pole piece to the field yoke of the motor.

A further object is to form the compensating loop in sections to permit its expeditious attachment and to permit the convenient placement of the pole piece and the surrounding field winding.

The invention further consists in the several features hereinafter set forth and more particularly defined by the annexed claims.

Figure 1:
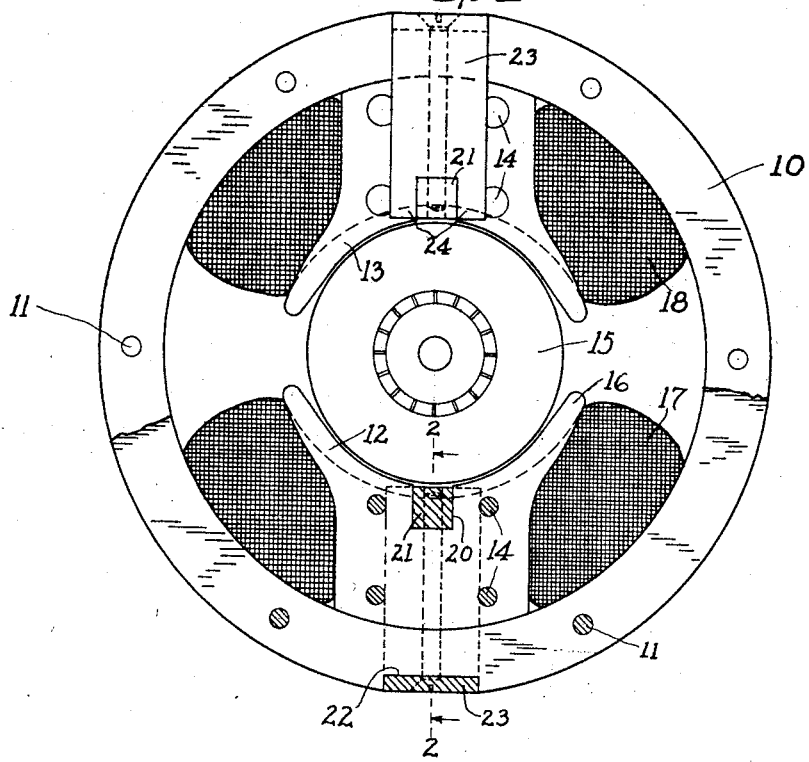
Figure 2:
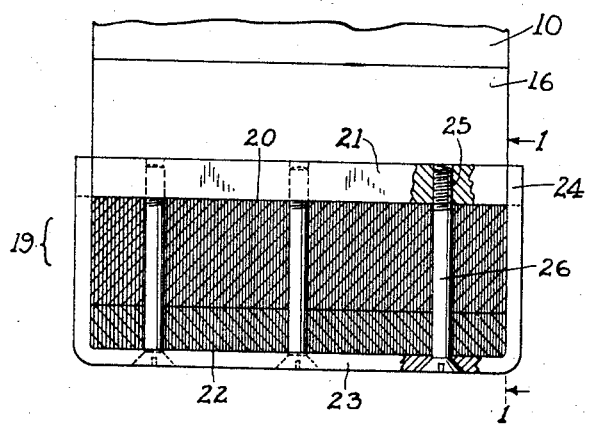

In the accompanying drawings, Fig. 1 is an end elevation of an electric motor embodying the invention, parts being broken away and parts being shown in section; and Fig. 2 is a transverse sectional view of the motor field frame taken on the line 2—2 of Fig. 1.

In the drawings, the numeral 10 indicates a laminated field yoke of any suitable construction, here shown to be annular in shape. The laminations of the field yoke may be secured in assembled relation in any suitable manner as by means of rivets or bolts 11. Laminated pole pieces 12 and 13, separate from the field yoke, are secured within the field yoke at opposite sides thereof and have convex outer ends abutting against the interior surface of the field yoke. The laminations of each pole piece may be secured in assembled relation in any suitable manner as by means of rivets or bolts 14. The inner or adjacent ends of the pole pieces are concave to form spaced pole faces receiving between them a rotatable commutator-equipped armature 15. The pole tips 16 preferably diverge away from the armature in order to obtain quiet motor operation. Field windings 17 and 18 are placed about the pole pieces 12 and 13, respectively, to excite them in opposite polarity and may be arranged in series with the armature between them.

In order to minimize the effective armature inductance to thereby secure good commutation and to permit satisfactory operation of the motor on alternating current, compensating means are provided which consists in the present case of a low resistance metal loop 19 having one portion arranged along the pole face parallel to the armature and an opposite portion arranged along the exterior of the field yoke, the loop lying in a substantially radial plane passing through the axis of the armature. In the present instance, each pole piece 12 and 13 is provided with a channel 20 extending longitudinally of the pole face in a substantially medial location. A copper bar 21 forming part of the loop 19 fits within the channel 20 to lie substantially flush with the pole face and projects from opposite ends of the pole piece. The field yoke 10 is provided with the channel 22 preferably wider than the channel 21 and extending parallel to it to receive the intermediate portion of a U-shaped copper bar 23 which fits therein to lie substantially flush with the outer surface of the yoke. The legs of the U-shaped bar 23 abut against opposite ends of the yoke and pole piece and have forked ends 24 which receive therein the projecting ends of the copper bar 21. The ends of the bar 21 are electrically united to the forked ends of the bar 23 in any suitable manner as by soldering or brazing.

In the present instance, the bar 21 is utilized as a means for securing the pole piece on the yoke. This is accomplished by providing threaded apertures 25 in the bar 21 extending in the plane of the loop and receiving the threaded ends of attaching screws 26, the head portions of which enter apertures in the intermediate portions of the bar 23 lying in the channel 22. In this manner, each pole piece may be secured firmly and accurately in place by means including the compensating loop. Each field winding 17 and 18 is placed about the pole piece prior to the attachment of the pole piece to the yoke and this enables the available winding space to be utilized to best advantage. Should it ever become necessary to replace the winding, this may be readily accomplished by removing the screws 26 and detaching the bar 21 from the ends of the U-shaped bar 23. It will be seen that the compensating loop can be applied to the motor in a simple and effective manner and without reducing the available space for the field winding.

The use of compensating windings has been common in single phase commutator motors but the means heretofore employed for such purposes have been of complicated and expensive construction interfering with the effective utilization of the available winding space. For these reasons, the compensating means heretofore devised have not been adapted for use in the smaller motors, especially the fractional horsepower sizes, where it is essential that any such means be of simple and inexpensive construction. The motor construction of this invention not only provides a means whereby the same motor can be operated with a high degree of universality on both direct and single phase alternating current, but also provides a means whereby shunt characteristics can be readily imparted to the motor to permit of a constant though adjustable motor speed on alternating current operation.

When relatively low motor speeds are desired with either the series type of motors or those having shunt characteristics, such speeds may be readily obtained by controlling the mean value of load current, as in the above United States Letters Patent No. 1,630,394, and in such cases, employing either interrupted or pulsating direct or alternating current, the compensating means is effective to insure efficient motor operation and to avoid excessive heating.

In many small motor-driven devices requiring constant speed fractional horse-power motors, the small and compact motors embodying the invention can be employed to good advantage to replace the bulky, heavy and not very efficient induction motors. In such devices the motors of the present invention permit the constant though adjustable speed which is not possible with induction motors. In small motor-driven machines intended for operation indiscriminately on either alternating or direct current, the motors of this invention are particularly useful, especially in machines intended for field demonstration purposes.

What I claim as new and desire to secure by Letters Patent is:

1. In an electric motor, the combination of a field yoke having an inwardly projecting polar portion including a polar face, a rotatable armature co-operating with said polar face, a field winding surrounding said polar projection, compensating means including a conducting loop disposed on said polar portion, and means including said conducting loop for securing said polar portion to said yoke.

2. In an electric motor, the combination of a field yoke, a pole piece within said field yoke having a channel in its polar face, a rotatable armature co-operating with said polar face, a field winding about said pole piece, compensating means comprising a conducting loop, including a portion in said channel, and attaching means engaging said loop for securing said pole piece to said yoke.

3. In an electric motor, the combination of a field yoke, a pole piece within said field yoke having a longitudinal channel in its polar face, a rotatable armature co-operating with said polar face, a field winding about said pole piece, compensating means comprising a conducting loop including a portion in said channel, and means for securing said pole piece to said yoke including attaching members extending through said pole piece substantially radially thereof and entering the portion of said loop within said pole face channel.

4. In an electric motor, the combination of a field member, a pole piece abutting against said field member and having a channel in its polar face, a rectangular compensating loop for said pole piece having one side portion disposed in said channel and having an opposite side portion disposed on the outside of said field member, and attaching screws connecting intermediate points of the opposite side portions of said loop and passing through said pole piece and field member to clamp said pole piece to said field member.

5. In an electric motor, the combination of a field member, a pole piece abutting against said field member and having a channel in its polar face, a rectangular compensating loop for said pole piece having one side portion disposed in said channel and having an opposite side portion disposed on the outside of said field member, said first-named side portion having tapped openings formed therein at intermediate points, and attaching screws connecting the opposite side portions of said loop and threaded into said tapped openings for clamping said pole piece to said field member.

6. In an electric motor, the combination of a field member, a pole piece abutting against said member and having a longitudinal channel in its polar face, a metal bar of low resistance disposed in said channel and having its opposite ends projecting therefrom, a U-shaped metal strap of low resistance saddled over said field member to engage the outer side thereof and having forked ends embracing and secured to the opposite ends of said bar to form a compensating loop for said pole piece, and means engaging said bar and distinct from the ends of said strap for securing said pole piece to said field member.

In testimony whereof I affix my signature.

ROYAL LEE.